(12) United States Patent
Bürkner et al.

(10) Patent No.: US 11,220,994 B2
(45) Date of Patent: Jan. 11, 2022

(54) WIND TURBINE ROTOR BLADE AND WIND TURBINE

(71) Applicant: Wobben Properties GmbH, Aurich (DE)

(72) Inventors: Falko Bürkner, Bremen (DE); Alexander Hoffmann, Emden (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/045,735

(22) PCT Filed: Apr. 11, 2019

(86) PCT No.: PCT/EP2019/059256
§ 371 (c)(1),
(2) Date: Oct. 6, 2020

(87) PCT Pub. No.: WO2019/201738
PCT Pub. Date: Oct. 24, 2019

(65) Prior Publication Data
US 2021/0180561 A1    Jun. 17, 2021

(30) Foreign Application Priority Data
Apr. 16, 2018    (DE) ............... 10 2018 108 906.6

(51) Int. Cl.
*F03D 1/06*    (2006.01)
(52) U.S. Cl.
CPC ......... *F03D 1/0675* (2013.01); *F03D 1/0658* (2013.01); *F05B 2240/301* (2013.01); *F05B 2240/302* (2013.01)

(58) Field of Classification Search
CPC .... F03D 1/0633; F03D 1/0641; F03D 1/0658; F03D 1/0675; F03D 1/0683; F05B 2240/301; F05B 2240/302
See application file for complete search history.

(56) References Cited

U.S. PATENT DOCUMENTS

| 4,389,162 A | 6/1983 | Doellinger et al. |
|---|---|---|
| 4,685,864 A | 8/1987 | Angus et al. |

(Continued)

FOREIGN PATENT DOCUMENTS

| DE | 2921152 A1 | 11/1980 |
|---|---|---|
| DE | 102010046518 A1 | 3/2012 |

(Continued)

*Primary Examiner* — Courtney D Heinle
*Assistant Examiner* — Sang K Kim
(74) *Attorney, Agent, or Firm* — Seed Intellectual Property Law Group LLP

(57) ABSTRACT

There is provided a wind turbine rotor blade having a blade outer side, a wall with a laminate, a blade inner side and at least a first and a second rotor blade part. The at least one first and second rotor blade parts are fixed together by means of at least one connecting unit in a separation plane. The connecting unit has at least one cable with a first end with cable fibers which are fixed in or at the laminate of the wall. The connecting unit has at least one projection at the first and second rotor blade parts respectively. The projections are respectively fixedly connected to the wall of rotor blade. The at least one cable is connected at at least one projection. The connecting unit has at least one tensioning element, by means of which the projections on the first and second rotor blade parts can be braced with each other.

7 Claims, 5 Drawing Sheets

(56) References Cited

U.S. PATENT DOCUMENTS

| | | | |
|---|---|---|---|
| 8,888,462 B2 | 11/2014 | Klein | |
| 2012/0070296 A1* | 3/2012 | Klein | F03D 1/0675 |
| | | | 416/204 R |
| 2014/0030097 A1* | 1/2014 | Dahl | B29C 70/86 |
| | | | 416/217 |
| 2016/0341177 A1* | 11/2016 | Bech | F03D 1/0675 |
| 2018/0320655 A1 | 11/2018 | Zhou | |
| 2018/0372067 A1* | 12/2018 | Hoffmann | F03D 13/10 |
| 2019/0338750 A1* | 11/2019 | Bech | B29C 70/72 |

FOREIGN PATENT DOCUMENTS

| | | | |
|---|---|---|---|
| DE | 102010046519 A1 | 3/2012 | |
| WO | 2017/076095 A1 | 5/2017 | |
| WO | 2017/085088 A1 | 5/2017 | |
| WO | WO-2021008666 A1 * | 1/2021 | F03D 1/0675 |

* cited by examiner

WIND TURBINE ROTOR BLADE AND WIND TURBINE

BACKGROUND

Technical Field

The present invention concerns a wind turbine rotor blade and a wind turbine.

Description of the Related Art

Rotor blades of modern wind turbines can now be so long that transportation of the rotor blade in one piece is no longer possible. Therefore a rotor blade of a wind turbine can be of a multi-part design configuration so that the respective parts are delivered separately to the construction site and are then fitted together there.

WO 2017/085088 A1 discloses a rotor blade of a wind turbine having a blade inner side, a blade outer side and a first and a second rotor blade part which are fixed together by means of a fixing unit in a separation plane. The fixing unit has a transverse bolt and a steel cable which is passed through a hole in the second rotor blade part and clamped in the clamping unit. The second end of the steel cable is clamped in the first clamping unit on the blade outer side. The second clamping unit is provided on the blade inner side.

On the German patent application from which priority is claimed the German Patent and Trade Mark Office searched the following documents: DE 29 21 152 A1, DE 10 2010 046 518 A1, DE 10 2010 046 519 A1 and WO 2017/085 088 A1.

BRIEF SUMMARY

Provided is a wind turbine rotor blade and a wind turbine which permits a better connection between the parts of a multi-part wind turbine rotor blade.

Thus there is provided a wind turbine rotor blade having a blade outer side, a wall with a laminate, a blade inner side and at least a first and a second rotor blade part. The at least one first and second rotor blade parts are fixed together by means of at least one connecting unit in a separation plane. The connecting unit has at least one cable with a first end with cable fibers which are fixed in or at the laminate of the wall. The connecting unit has at least one projection at the first and second rotor blade parts respectively. The projections are respectively fixedly connected to the wall of rotor blade. The at least one cable is connected at at least one projection. The connecting unit has at least one tensioning element, by means of which the projections on the first and second rotor blade parts can be tensioned with each other.

The cable fibers of the cables are fixed in or connected to the laminate in fanned-out relationship.

Each cable has a fixing portion, in particular a cable loop, with which the cable can be fixed to the projection.

The rotor blade has at least one centering bolt which in the region of the separation plane projects both into the first and also into the second rotor blade part.

There are provided connecting units both on the blade inner side and also on the blade outer side.

There is provided a wind turbine having a rotor blade as described hereinbefore.

There is provided a wind turbine comprising at least two rotor blade connecting locations, and two wind turbine rotor blades which respectively have a rotor blade outer side, a wall having a laminate and a rotor blade inner side. The rotor blades are coupled by means of a plurality of connecting units at the rotor blade connecting locations. The connecting units respectively have a cable with a first end which has a plurality of cable fibers which are provided in or at the laminate of the rotor blade. The cable has a fixing portion with which the cable is fixed at a projection which is fixedly coupled to the laminate of the rotor blade. The connecting units each have at least one tensioning element which braces the projections with a rotor blade connecting location.

Provided is a wind turbine having at least one wind turbine rotor blade as described hereinbefore.

Provided is a method of assembling a wind turbine rotor blade which has a rotor blade root, a rotor blade tip, a wall, a rotor blade inner side, a rotor blade outer side and at least a first and a second rotor blade part which are fixed together by means of at least one fixing unit in a separation plane.

Further configurations of the invention are subject-matter of the appendant claims.

The connecting of two components (for example GRP components, glass fiber-reinforced plastic components or carbon fiber-reinforced plastic components) of a rotor blade of a wind turbine is provided in such a way that maintenance of the connection is possible even from the interior of the rotor blade. A fixing unit is provided for connecting two components of a wind turbine rotor blade.

BRIEF DESCRIPTION OF THE SEVERAL VIEWS OF THE DRAWINGS

Advantages and embodiments by way of example of the invention are described in greater detail hereinafter with reference to the drawing.

DETAILED DESCRIPTION

Figure 1:
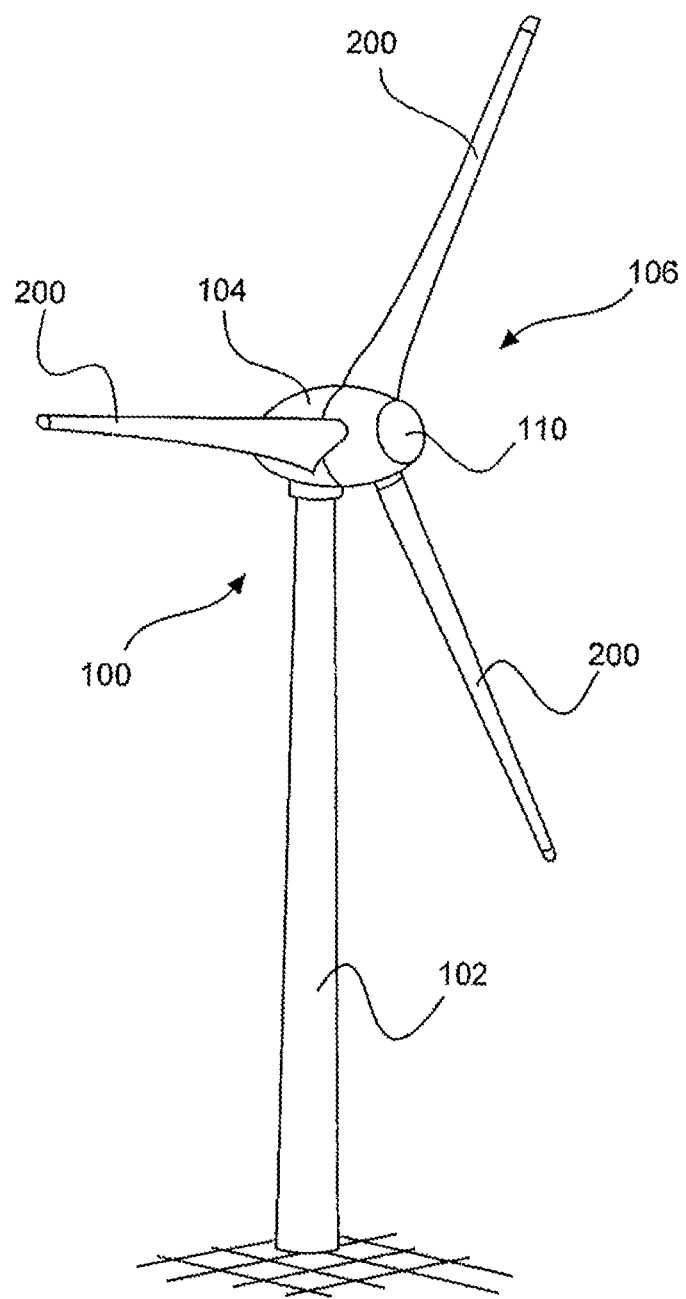
FIG. 1 shows a diagrammatic view of a wind turbine according to the invention.

FIG. 1 shows a diagrammatic view of a wind turbine according to the invention. The wind turbine 100 has a tower 102 and a nacelle 104 on the tower 102. Provided on the nacelle 104 is an aerodynamic rotor 106 having three rotor blades 200 and a spinner 110. The aerodynamic rotor 106 is driven in rotation in operation of the wind turbine by the wind and thus also rotates a rotor or rotor member of a generator directly or indirectly coupled to the aerodynamic rotor 106. The electric generator is arranged in the nacelle 104 and generates electric power. The pitch angles of the rotor blades 200 can be altered by pitch motors at the rotor blade roots of the respective rotor blades 200.

Figure 2:
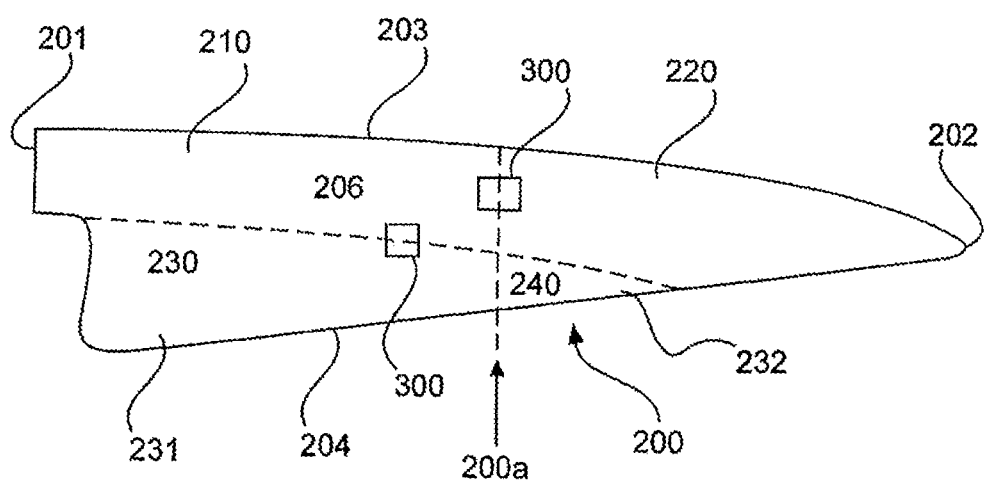
FIG. 2 shows a diagrammatic view of a multi-part wind turbine rotor blade.

FIG. 2 shows a diagrammatic view of a multi-part wind turbine rotor blade for the wind turbine 100. The rotor blade has a rotor blade root 201, a rotor blade tip 202, a rotor blade leading edge 203 and a rotor blade trailing edge 204 and comprises for example three parts or portions 210, 220, 230. The rotor blade 200 has a separation plane 200a. The rotor blade parts 210, 220, 230 can be secured together for example by means of connecting units 300 at the separation plane 200a. The portion 230 can be of a two-part configuration 231, 232, the first part 231 being fixed to the first portion 210 and the second part 232 being fixed to the second portion 220.

The rotor blade 200 further has a wall 205, a rotor blade inner side 206 (on the inside of the wall) and a rotor blade outer side 207. The rotor blade 200 is typically produced by two half-shell portions being fixed together or glued to each other. That results in a rotor blade inside 206 and a rotor blade outer side 207 representing the external surface of the rotor blade.

Figures 3A, 3B:
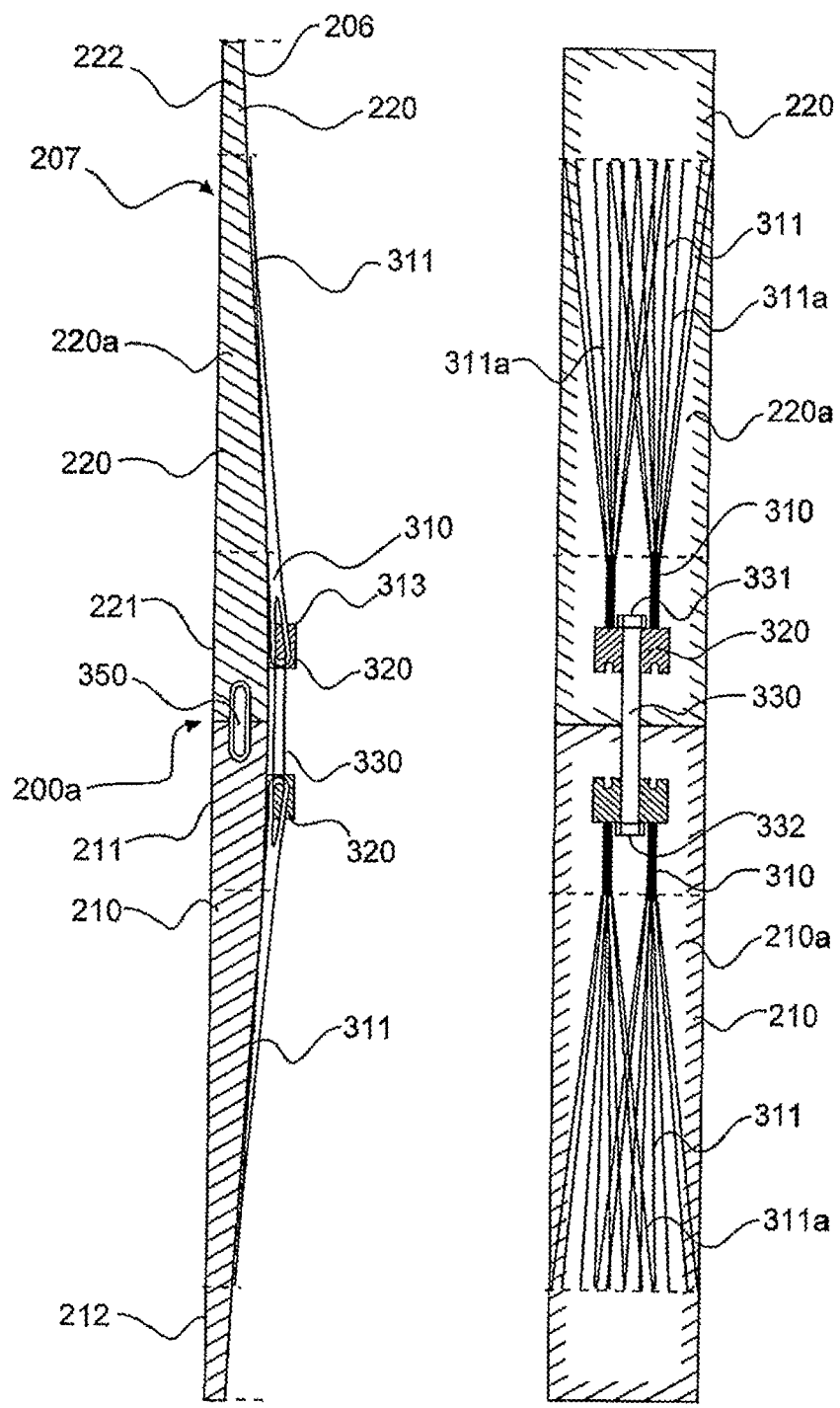
FIG. 3A show a diagrammatic sectional view of a separation location in FIG. 2.
FIG. 3B shows a diagrammatic plan view of a separation location in FIG. 2.

FIG. 3A shows a diagrammatic sectional view of a separation location in FIG. 2. The wind turbine rotor blade 200 has a first and a second part 210, 220 which are separated from each other by a separation location 200a.

The first and second rotor blade parts 210, 220 each have at their end 211, 221 which is towards the separation plane 200a a thicker wall, that is to say the laminate 210a, 220a can be thicker there. The first and second rotor blade parts 210, 220 are connected together by way of at least one connecting unit 300. The connecting unit 300 has at least one first cable 310, at least one projection 320 and a tensioning element 330. The tensioning element 330 serves to connect a projection 320 on the first part 210 and a projection 320 on the second part 220 to each other or to brace them relative to each other. The connecting unit 300 further has at least one cable 310 with a first end 311 having a plurality of cable fibers or strands 311 which are connected or glued in force-locking relationship to a laminate 210a, 220a. The cable 310 has a fixing portion 313, by means of which the cable 310 is fixed at or in the projection 320. The projections 320 are fixedly connected to the laminate 210a, 220a.

Optionally the fan-shaped cable fibers 311 can be tied by means of a thread 311a in order to ensure the proper fiber configuration upon being laid dry in the blade mold. Optionally the fan-shaped cable fibers 311 are introduced dry into the laminate or introduced during production of the laminate.

The projections 320 are provided on a rotor blade inner side 206. The first ends 311 of the cables 310 are correspondingly also provided at the blade inner side 206.

The cable fibers 311 of the cables 310 are introduced dry into the mold for the blade laminate in production of the latter. The rotor blade part can then be finished for example by means of vacuum infusion. In that case it is possible to achieve the cable fibers which are spread out in a fan shape being connected to the blade material of the rotor blade part in force-locking relationship after the infusion operation.

Through bores in the laminate are not necessary to connect the two rotor blade parts together. That is particularly advantageous because in that way the thickness of the laminate can be reduced.

The tensioning elements 330 can be tightened by means of a torque wrench. For checking the bracing force the tensioning element 330 can be subsequently loaded afresh with a torque.

The cable loops 311 can be so positioned that lifting-off forces on the cable fibers in relation to the rest of the blade laminate are reduced. For that purpose the cable loops can be positioned in the region of the thick-wall laminate near the flange. In that case the region of load transmission in the laminate is provided on the unwound or shafted laminate region. Lifting-off forces can thus be reduced by deflection of the cable fibers at the kink point of the flange laminate.

Optionally, for further improving the connection between the first and second rotor blade portions 210, 220, at least one centering bolt 350 can be provided in the laminate 210a, 220a in the region of the separation location 200a.

Figure 4A:
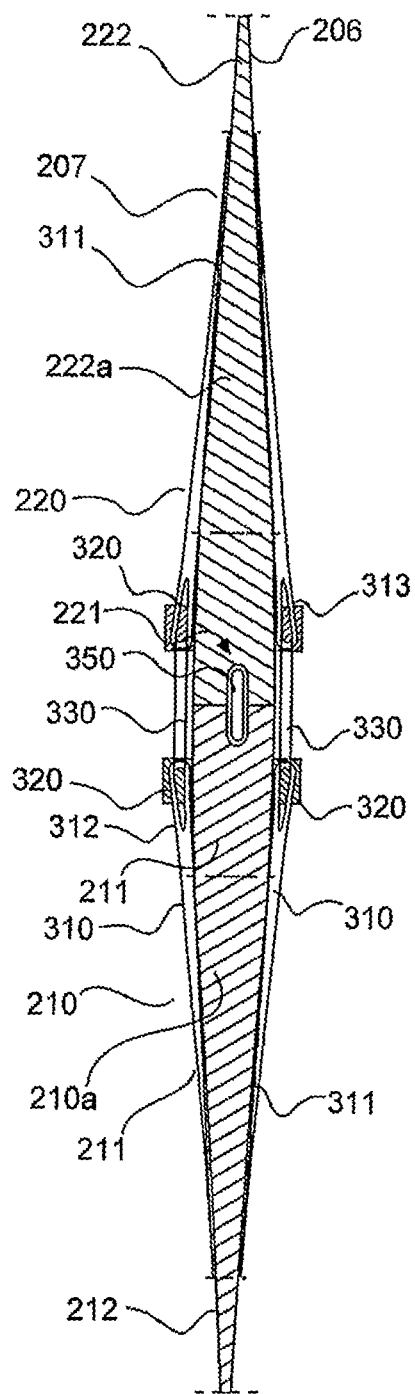
FIG. 4A show a diagrammatic sectional view of a separation location of a rotor blade in FIG. 2, FIG. 4B show a diagrammatic plan view of a separation location of a rotor blade in FIG. 2, FIG. 5A show a diagrammatic sectional view of a separation location of a rotor blade in FIG. 2, and FIG. 5B show a diagrammatic plan view of a separation location of a rotor blade in FIG. 2.
Figure 4B:
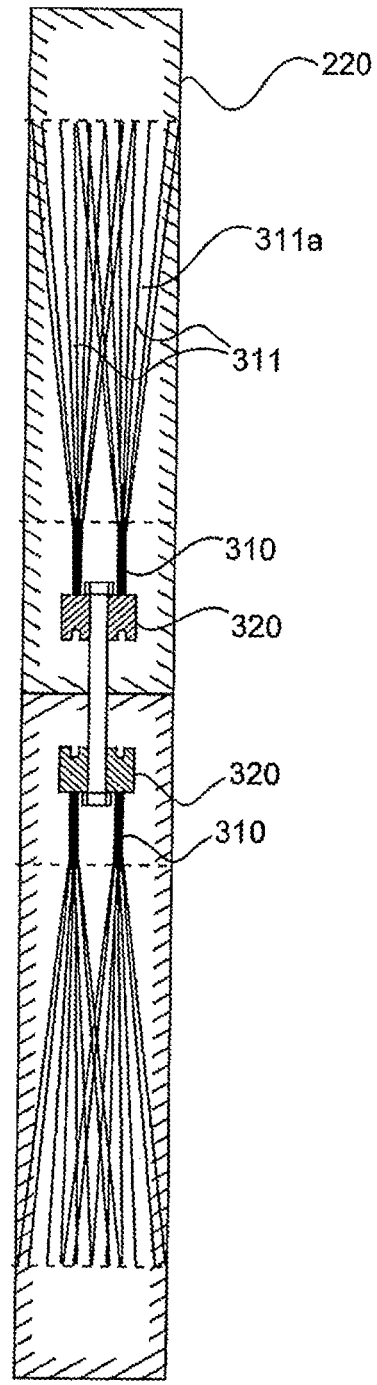

FIG. 4A shows a diagrammatic cross-section and FIG. 4B shows a diagrammatic plan view of a separation location of a rotor blade. While in the embodiment of FIGS. 3A and 3B the connecting unit 300 is provided on the rotor blade inner side 207 the embodiment of FIGS. 4A and 4B provides that a connecting unit 300 is provided both on the rotor blade inner side 206 and also on the rotor blade outer side 207. The structure of the connecting unit 300 in the embodiment of FIGS. 4A and 4B corresponds to the structure of the fixing unit 300 of the embodiment of FIGS. 3A and 3B. Each of the connecting units 300 (on the rotor blade outer side and the rotor blade inner side) thus has at least one cable 310 with cable 311 which are of a fanned-out configuration at the first end of the cable and are embedded or fixed in the laminate 222a, 210a. The cables 310 are connected to the projections 320 which for example can be in the form of cleats. The projections 320 can be braced relative to each other by means of the tensioning elements 330. This can therefore permit a connection of two rotor blade parts without through bores in the laminate region being necessary for that purpose. Optionally centering bolts 350 can be provided. The thickness of laminate 320 in the region of the separation location is greater than in the rest of the blade. The projections can be fixedly connected to the laminate 210a, 220a.

Figure 5A:
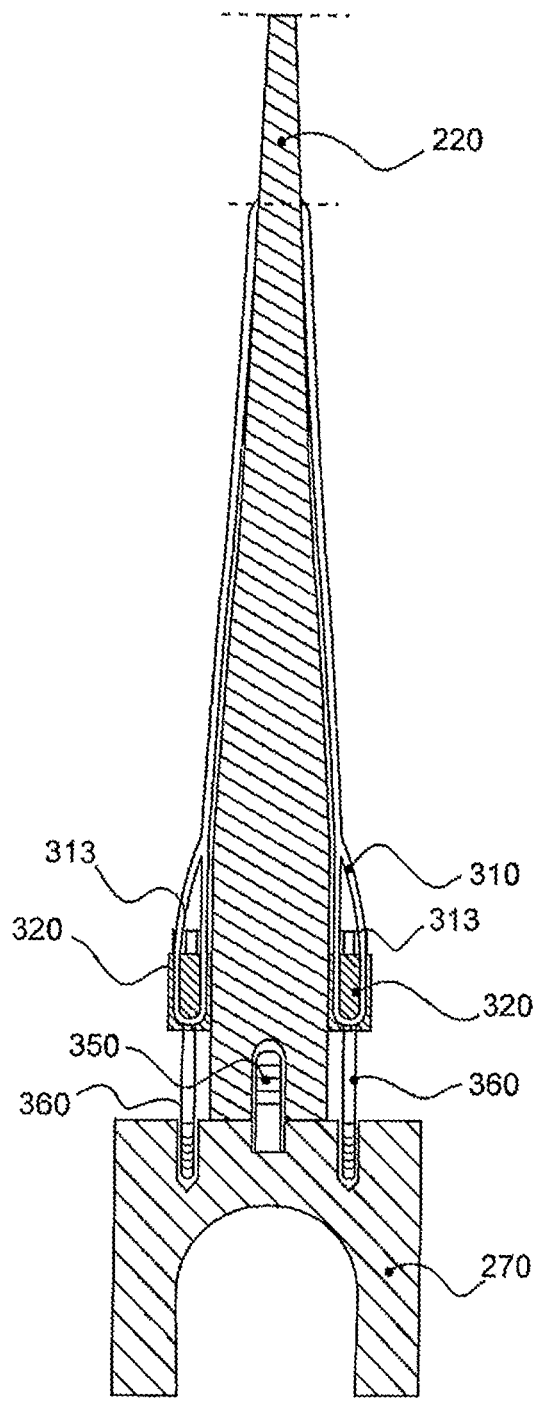
Figure 5B:
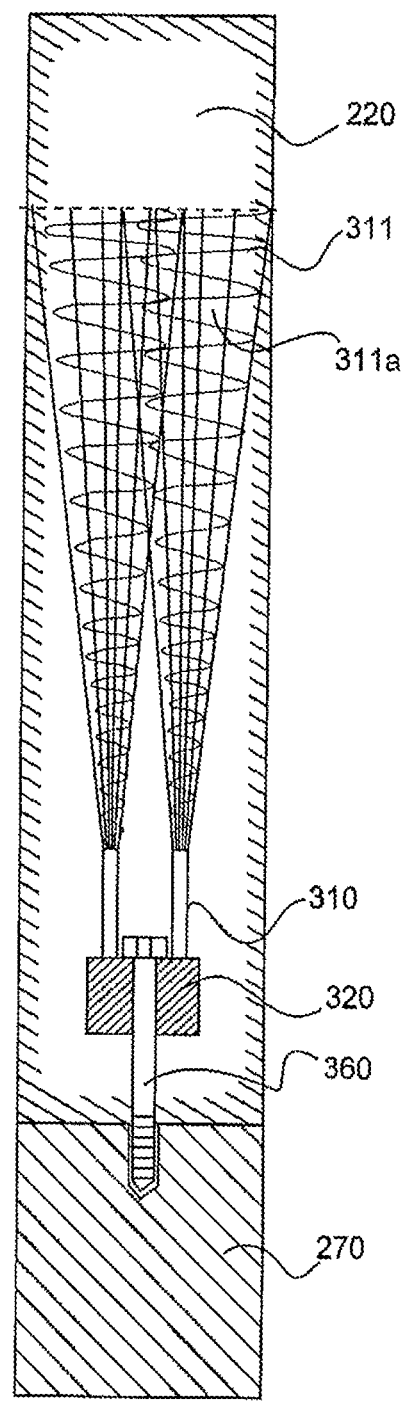

FIG. 5A shows a diagrammatic cross-section of a flange connection and FIG. 5B shows a diagrammatic plan view of a flange connection. In the FIG. 5A embodiment a flange 270 is connected to a part 220 of the rotor blade by means of the connecting units 300. For that purpose the connecting units 300 have cables 310 with cable fibers at the first end 311 which are of a fanned-out configuration. Optionally the fanned-out cable fibers 311 can be tied with a thread 311a. As in the other embodiments the cable fibers 311 are integrated into the laminate of the part of the rotor blade. The connecting unit 300 further has projections or cleats 320 which are connected to the laminate of the rotor blade 200 and receive a part of the cables 310. In particular for example a cable loop 313 can be laid around the projections 320 or connected thereto. The connecting units 300 can further have a tensioning element 360, one end of which is for example screwed into the connecting flange 270. A screw for example can be provided at the other end to be able to apply a pretensioning force to the cables.

In the embodiment of FIGS. 5A and 5B only one half of the fixing unit of FIG. 4 is used to fix a rotor blade to a flange.

The embodiment of FIGS. 5A and 5B represents a two-row flange connection.

Provided is a multi-part rotor blade which advantageously has a reduced laminate thickness in the region of the separation location between the first and second rotor blade parts without endangering the stability of the connection.

The invention claimed is:
1. A wind turbine rotor blade, comprising:
   a blade outer side;
   a wall having a laminate;
   a blade inner side; and
   at least a first rotor blade part and a second rotor blade part fixed together by at least one connecting unit in a separation plane, wherein the at least one connecting unit has at least one cable with a first end with cable fibers fixed in or connected to the laminate of the wall, wherein the at least one connecting unit has at least one projection at the first and second rotor blade parts, respectively, wherein the respective at least one projections are fixedly connected to the laminate of the wall, wherein the at least one cable are connected at the at least one projection, wherein the at least one connecting unit has at least one tensioning element, wherein the respective at least one projections at the first and second rotor blade parts are configured to be braced with each other, wherein the cable fibers of the at least one cable are fixed in or connected to the laminate in a fanned-out relationship.

2. The wind turbine rotor blade according to claim 1, wherein the at least one cable has a fixing portion that is fixed to the at least one projection.

3. The wind turbine rotor blade according to claim 2 wherein the fixing portion is a cable loop.

4. The wind turbine rotor blade according to claim 1 further comprising at least one centering bolt, wherein the at least one centering bolt, in a region of the separation plane, projects into the first and the second rotor blade parts.

5. The wind turbine rotor blade according to claim 1 wherein the at least one connecting unit is a plurality of connecting units.

6. A wind turbine, comprising:
a nacelle;
an aerodynamic rotor; and
at least one wind turbine rotor blade according to claim 1 coupled to the aerodynamic rotor.

7. A wind turbine, comprising:
at least two rotor blade connecting locations, and
at least two wind turbine rotor blades, each having a rotor blade outer side, a wall having a laminate, and a rotor blade inner side,
wherein the at least two wind turbine rotor blades are coupled by a plurality of connecting units at the at least two rotor blade connecting locations,
wherein each of the plurality of connecting units have a cable with a first end having a plurality of cable fibers provided in or at the laminate of the respective wind turbine rotor blade,
wherein the respective cables have a fixing portion with which the cable is fixed at a projection, which is fixedly coupled to the laminate of the respective wind turbine rotor blade,
wherein each of the plurality of connecting units have at least one tensioning element which braces the projection with the rotor blade connecting location,
wherein the plurality of cable fibers of the respective cables are fixed in or connected to the laminate in a fanned-out relationship.

* * * * *